E. W. LARSEN.
SYNCHRONOUS TELEGRAPHY.
APPLICATION FILED NOV. 9, 1912.

1,146,581. Patented July 13, 1915.
6 SHEETS—SHEET 2.

Fig. 7.
Sec. Y-Y.

WITNESSES
H. E. Lambert
H. E. Sorensen

INVENTOR
EINER W. LARSEN
BY Paul & Paul
ATTORNEYS.

Fig. 9.

E. W. LARSEN.
SYNCHRONOUS TELEGRAPHY.
APPLICATION FILED NOV. 9, 1912.

1,146,581.

Patented July 13, 1915.
6 SHEETS—SHEET 5.

WITNESSES
H. E. Lambert
G. E. Sorensen

INVENTOR
EINER W. LARSEN.
BY Paul & Paul
ATTORNEYS.

E. W. LARSEN.
SYNCHRONOUS TELEGRAPHY.
APPLICATION FILED NOV. 9, 1912.

1,146,581.

Patented July 13, 1915.
6 SHEETS—SHEET 6.

Fig. 13.

WITNESSES
H. E. Lambert.
S. E. Sorensen.

INVENTOR
EINER W. LARSEN.
BY Paul & Paul
ATTORNEYS.

UNITED STATES PATENT OFFICE.

EINER W. LARSEN, OF MINNEAPOLIS, MINNESOTA.

SYNCHRONOUS TELEGRAPHY.

1,146,581.     Specification of Letters Patent.     Patented July 13, 1915.

Application filed November 9, 1912. Serial No. 730,371.

*To all whom it may concern:*

Be it known that I, EINER W. LARSEN, a citizen of the United States, residing at Minneapolis, in the county of Hennepin and State of Minnesota, have invented certain new and useful Improvements in Synchronous Telegraphy, of which the following is a specification.

My invention relates to certain improvements in the art of synchronous multiplex telegraphy, and is particularly directed to the attainment of a stable, non-oscillatory system of synchronism.

The drawings show my method for maintaining such a system in constant equilibrium irrespective of the number of transmission channels working. No contacts, on the so-called "sunflower", are reserved for the express purpose of correcting the synchronism, but a predetermined number of impulses is sent into the line per second, every one of which helps to maintain the synchronism, the said impulses being of any polarity or strength (within working limits). It will be easily understood that a system working on this principle, where the synchronism is as perfect as possible, is extremely flexible, and lends itself to the working of many instruments simultaneously over a single wire, such as the transmission of a number of Morse messages or the selection of the different characters required in printing telegraphy. These impulses sent over the line are fixed in number, and by the modification of these impulses such as changes in polarity or strength, are the different instruments operated. The synchronism is independent of the number of such modifications, in contradistinction to systems allowing only a few such modifications and hence lowering the rate of transmission or the working capacity of the line. The synchronism depends primarily upon the number, and not the character, of impulses sent over the line. Thus, any system relying on alternating current for its synchronism, must necessarily depend upon the rhythm or alternations of the current and hence the integral of a large number of modifications of polarity when transmitting obviously tends to make the synchronism unstable. In other words, the capacity of the line is lowered.

Referring to the drawings.

It must be understood that the driving mechanism of both transmitter and receiver may be any motive power such as an ordinary electric or spring motor. The construction followed in the drawings permits a constant normal speed which may be easily changed by the synchronizing impulses.

The motors, one at each end of the line, are identical in construction, so that I shall designate by the letter "$a$" the one that governs the other and by the letter "$b$" the other, or the one that is governed or synchronized to the first. This notation will assist in understanding the diagrams.

Figure 1:
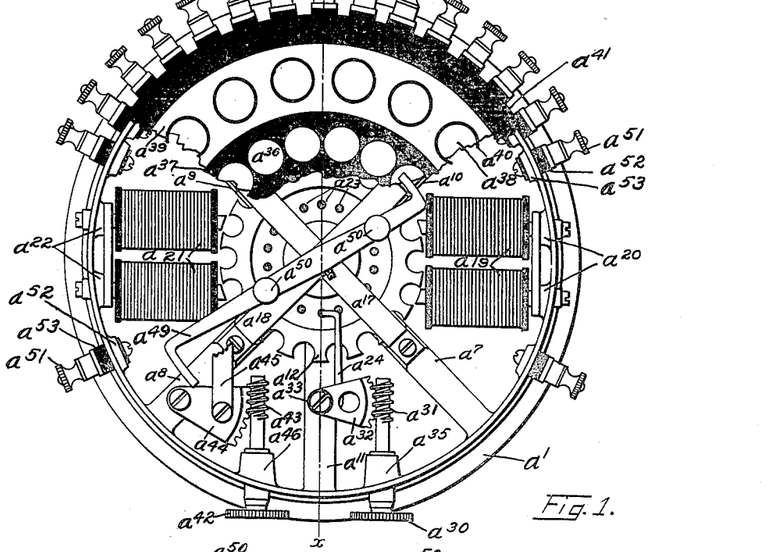
—Figure 1 is a top view of one of the motors, part of the sunflowers being broken away.
Figure 2:
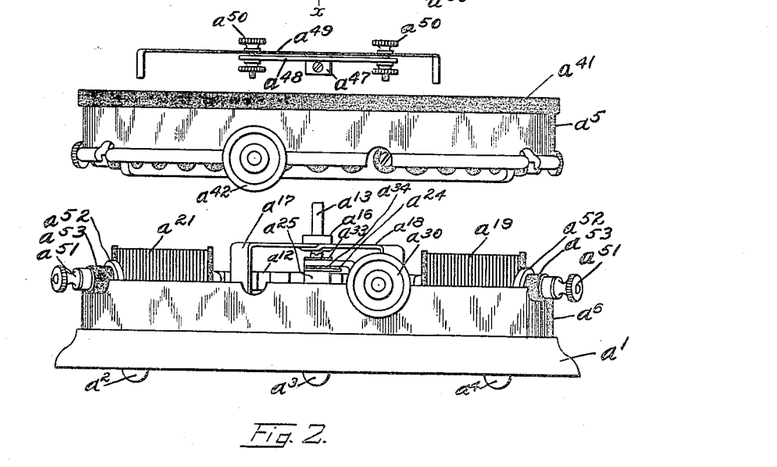
Fig. 2 is a view in side elevation of the motor in Fig. 1, showing the motor opened and the trailer disconnected.
Figure 3:
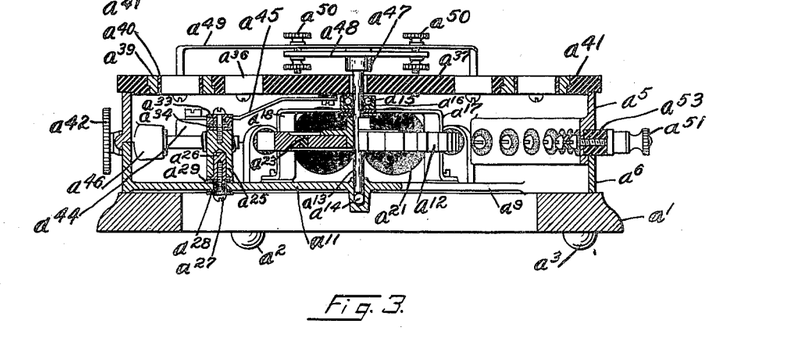
Fig. 3 is a cross section of the motor, taken on the line "$x-x$", of Fig. 1.
Figure 4:
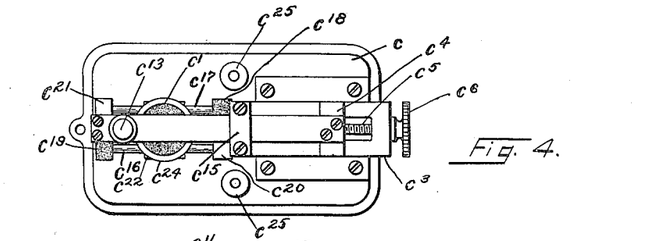
Fig. 4 is a top view of the speed indicator and governor.
Figures 5, 6, 7:
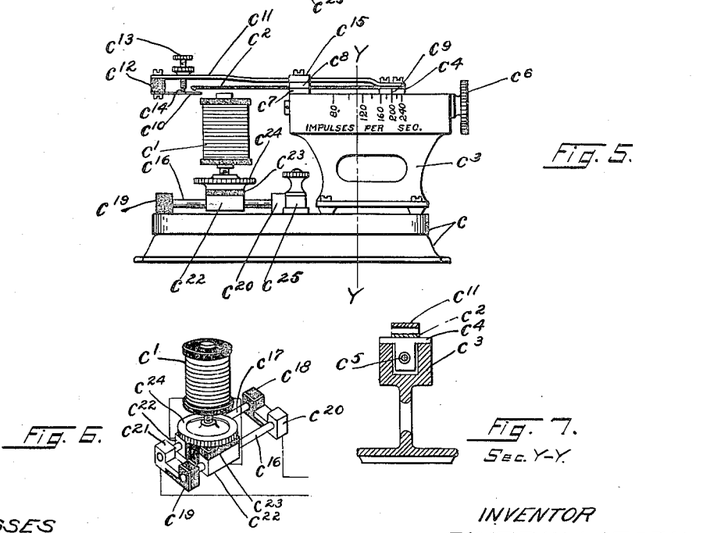
Fig. 5 is a side elevation of Fig. 4.
Fig. 6 is a perspective of the magnet shown in Fig. 5, and also its guides.
Fig. 7 is a cross-section of Fig. 5, taken on the line "$y-y$"

The motor, shown in Figs. 1, 2 and 3, is mounted on a suitable base, $a^1$, supported by the three feet, $a^2$, $a^3$, and $a^4$. The motor is inclosed by a metal casing consisting of an upper and a lower half, $a^5$ and $a^6$, respectively. For inspection of the motor, $a^5$ and $a^6$, may be separated as shown in Fig. 2. $a^6$ has five ribs, $a^7$, $a^8$, $a^9$, $a^{10}$, and $a^{11}$, intersecting at the center. A soft-iron toothed armature disk, $a^{12}$, rotates horizontally on the spindle, $a^{13}$, the lower end of which rests on a ball-bearing, $a^{14}$, dropped into a hole at the intersection of the ribs, $a^7$, $a^8$, $a^9$, $a^{10}$, and $a^{11}$. The upper end of the spindle turns on ball-bearings, $a^{15}$, contained in the ball race, $a^{16}$, which is supported by a spider formed by the crossing of the two strips $a^{17}$ and $a^{18}$. The pair of magnets $a^{19}$ is supported horizontally on bosses $a^{20}$, and the magnet $a^{21}$ is supported in the same way on the bosses $a^{22}$, but diametrically opposite. The bosses $a^{20}$ and $a^{22}$ are cast on the lower casing, $a^6$. The distance between the pole centers of the magnets, is equal to twice the distance between the armature teeth which swing past the polar projections of the magnets. Into the armature and equidistant from the center, are driven fiber pieces, $a^{23}$, equal in number to the armature teeth. A contact arm or brush, $a^{24}$, is mounted on a vertical brass standard, $a^{25}$, which is adapted to rotate on the stud $a^{26}$. This stud is fastened to the rib, $a^{11}$, by the screw, $a^{27}$, and insulated by the fiber rings, $a^{28}$ and $a^{29}$, as shown in Fig. 3. The position of the arm, $a^{24}$, is varied by means of a thumb nut, $a^{30}$, working a worm, $a^{31}$, which in turn engages a segment of a gear, $a^{32}$, which is fastened to the top of the standard, $a^{25}$, and insulated therefrom by the fiber rings, $a^{33}$ and $a^{34}$. The support or bearing for the thumb nut $a^{30}$, and worm $a^{31}$, is a boss, $a^{35}$, cast on the lower casing $a^{6}$.

The transmitting and receiving sunflowers rest horizontally on the upper casing $a^{5}$. The receiver is within the transmitter and consists of a number of metal contacts, $a^{36}$, driven into a fiber disk, $a^{37}$, equidistant from the center of the motor. The transmitting sunflower has the same number of metal contacts, $a^{38}$, set into the metal ring, $a^{39}$, and insulated therefrom by means of the fiber rings, $a^{40}$. This ring $a^{39}$, is insulated from the casing by the fiber ring, $a^{41}$. The transmitting dial, $a^{39}$, is fixed in position relative to the casing or framework, but the receiver, $a^{37}$, is adapted to rotate within $a^{39}$, by means of a thumb-nut, $a^{42}$. This operates a worm, $a^{43}$, which engages a segment of a gear, $a^{44}$, from which an arm, $a^{45}$, runs to the receiving sunflower. The support or bearing for the thumb screw is a boss, $a^{46}$, cast on the upper casing, $a^{5}$.

A contact arm or trailer comprising a hub, $a^{47}$, stiff horizontal piece, $a^{48}$, and flexible arms, $a^{49}$, is adapted to be set-screwed on to the upper extremity of the spindle $a^{13}$, and to make contact with the contacts of the sunflowers, one extremity for the transmitter and the other for the receiver. The screws, $a^{50}$, are for the purpose of varying the pressure of the arms.

The binding-posts, $a^{51}$, are used for the magnets, $a^{19}$, and $a^{21}$, and are fastened by means of lugs, $a^{52}$, cast on the lower casing, $a^{6}$, and insulated by the fiber plugs, $a^{53}$. The remaining binding-posts are attached in the same way, but to the upper casing, $a^{5}$, and are used to make connection with the sunflowers.

The speed indicator and governor, shown in Figs. 4, 5, 6 and 7, is mounted on a suitable base, $c$. It consists, essentially, of a magnet, $c^{1}$, and a metallic reed, $c^{2}$, adapted to vibrate under the influence of the magnet $c^{1}$. The reed $c^{2}$, is mounted on a casting, $c^{3}$, and is adapted to be varied with respect to length in the following manner. One end is fixed to a piece, $c^{4}$, which runs in a depression in the casting $c^{3}$ by means of the screw, $c^{5}$, which is operated by the thumb-nut, $c^{6}$. The reed slides through two pieces $c^{7}$ and $c^{8}$, which are screwed to one end of $c^{3}$. Hence the rate of vibration of the reed is dependent upon the length from the clamp to its extremity. The reed may then be calibrated and a corresponding scale engraved upon the casting, $c^{3}$, as shown, the readings being taken from a notch, $c^{9}$, on the slide, $c^{4}$. The reed, $c^{2}$, is adapted to make contact with a flexible piece $c^{10}$, supported by the strip $c^{11}$ and insulated from it by the fiber block, $c^{12}$. The screw, $c^{13}$, is an adjustment for the length of time of contact, and carries a fiber tip, $c^{14}$, for insulation. The strip, $c^{11}$, follows the horizontal movements of the reed, and hence is screwed to the same block, $c^{4}$, and slides through the clamps, $c^{8}$, and $c^{15}$. To make the magnet, $c^{1}$, adjustable, two horizontal rods are employed, $c^{16}$ and $c^{17}$, insulated from each other at the supporting ends by alternate pieces of fiber, $c^{18}$, and $c^{19}$ and metal, $c^{20}$ and $c^{21}$. The magnet is mounted upon a movable carriage comprising two metal blocks, $c^{22}$, which ride upon the rods, $c^{16}$ and $c^{17}$, and a central piece of fiber, $c^{23}$, for insulation. The lower end of the magnet case is threaded but slides through a vertical hole in $c^{23}$. Between $c^{23}$ and the magnet $c^{1}$, is a large thumb nut, $c^{24}$, which upon being turned, moves the magnet up or down. To move the magnet horizontally, the whole carriage is moved. The wires from the magnet are connected one to each metal block, $c^{22}$. From there the current has a path through the rods, $c^{16}$ and $c^{17}$, thence to the pieces $c^{20}$ and $c^{21}$. From there wires are led, one to each of the binding-posts, $c^{25}$. It will readily be seen that the carriage may be moved to any position without the necessity of carrying any wires, except those from the magnet itself, with it.

Operation: I shall first describe the running of one of the motors, both being identical. It is driven by a source of electric current such as a battery, 2, Fig. 9, one side of which is connected to one side of the magnet, $a^{19}$, by the wire, 3. The other side of the magnet is connected with the arm, $a^{24}$, by means of wire 4. From the armature, $a^{12}$, or ground, a wire, 5, passes to the magnet, $c^{1}$, thence by way of wire 6 to the battery again. The circuit is made and broken by the arm, $a^{24}$, coming alternately into contact with the fiber pieces, $a^{23}$, and the armature, $a^{12}$. Hence the magnet, $a^{19}$, is energized at fixed intervals by the battery 2, such intervals coming when an armature tooth is approaching the poles of the magnet. The normal speed of the motor may be varied by turning the thumb-nut, $a^{30}$, thereby changing the lag or lead of the impulses through the magnet $a^{19}$. A rotation of the armature of course causes a rotation of the trailer, $a^{49}$. It must be understood that the motor will operate without the speed indicator or governor whose function will now be described.

Figure 9:
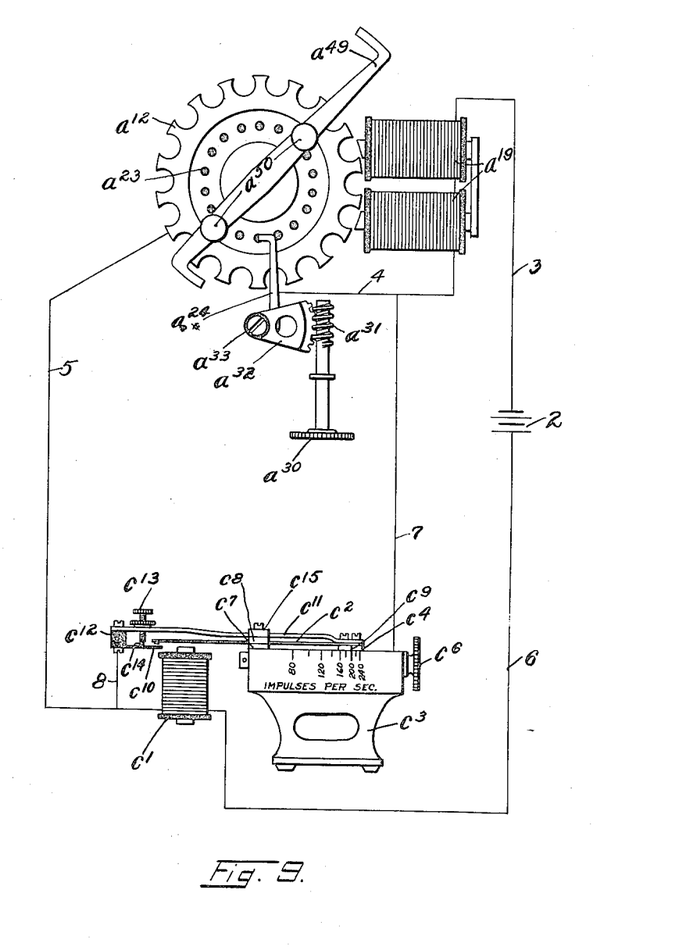
Fig. 9 is a diagrammatic view of the connections for driving the motors.

The reed is connected by means of wire 7 to the trailer, $a^{24}$, and the contact piece, $c^{10}$, is connected to the ground through wires 5 and 8. By inspection of these circuits it will be seen that a closing of the contacts of the reed and $c^{10}$, will short circuit the fiber pieces, $a^{23}$. Now the reed $c^2$ has in a given position, a free or natural period of vibration of its own, which as stated above may be read directly from the scale on $c^5$. The magnet, $c^1$, being in series with the drive circuit is of course energized at the same rate as the magnet, $a^{19}$, and attracts the reed, $c^2$, at intervals depending upon the speed of the motor armature. But the reed, being loosely coupled, as it were, to the magnet, $c^1$, does not respond to a very large extent to the latter's influence until the number of impulses passing through $c^1$ is exactly equal to the natural period of vibration of the reed. Then the reed performs vibrations of large amplitude, according to the well known laws of resonance. This violent vibration of the reed closes its contact with $c^{10}$, which short-circuits the motor contacts and hence tends to slow down its speed. This results in a dying out of the vibration of the reed and the motor tends to accelerate. Finally the motor settles down to a fixed speed where the overlapping of the motor contacts by the governor contacts is just enough to hold the motor to that speed, which is of course governed then by the free vibration of the reed. It will also be noted that the reading on the scale of $c^3$ corresponds to the number of armature poles passing the magnet $a^{19}$ and hence also records the number of contacts passed over by the trailer $a^{49}$, per unit of time, there being as many transmitting contacts (and of course receiving contacts) as poles on the armature. By dispensing with the contact $c^{10}$ the normal speed of the motor may be found by simply turning the nut $c^6$ until the reed vibrates in resonance and then taking the reading.

Figure 8:
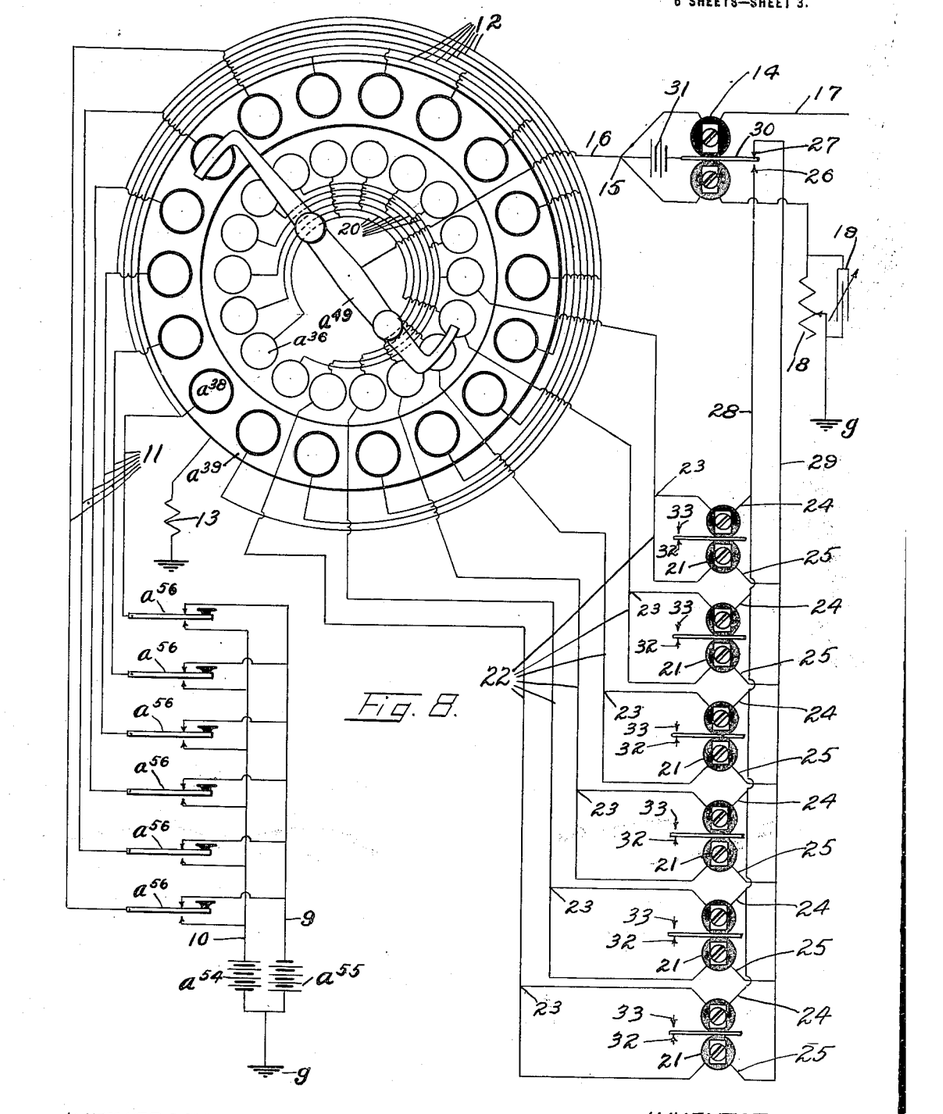
Fig. 8 is a diagrammatic view of the transmitting and receiving instruments at either end of the line.

Fig. 8 shows diagrammatically the transmitting and receiving circuits at one end of the line. The other end is identical with this, so far as these circuits are concerned. It must not be supposed that the number of ways of working this system is limited to the method illustrated in this diagram. On account of the extreme flexibility of the system innumerable modes of working present themselves. Fig. 8 shows one of the simpler methods. The source of power is a split battery $a^{54}$ and $a^{55}$, (which might be replaced by electric generators) grounded at its common side at $g$. Six transmitting keys, $a^{56}$, are shown, although the number is not limited to this. The back stops of all the keys are connected to the same side (say positive) of the battery by wire 9, and the front stops to the other side by wire 10. The grounds of all the six keys are connected to six successive contacts, $a^{38}$, on the transmitting sunflower through the wires 11. There being eighteen contacts on the sunflower and only six transmission channels, necessitates every sixth contact being connected together as shown by the wires 12. The ring, $a^{39}$, is connected to ground through a resistance 13 equal to the integral resistance of the battery $a^{54}$ or $a^{55}$. The main line relay 14, is an ordinary differentially wound polar relay, with its split, 15, connected to the trailer, $a^{49}$ by the wire 16. The main line is represented by 17, and the artificial line by 18, shunted by a variable condenser, 19, and grounded at $g$. This is the ordinary duplex balance, and permits signals being set in both directions on the line simultaneously.

Every sixth contact, $a^{36}$, on the receiving sunflower, is connected together by wires, 20. Six receiving relays, 21, differentially wound, are connected to six successive contacts, $a^{36}$, a wire 22, leading from the splits 23. The two wires 24 and 25 leading from the other sides of the relay magnets, are connected, one to each of the contacts 26 and 27 of the main line relay 14, by means of the wires 28 and 29, respectively. The tongue, 30, of the relay 14 is connected through the battery 31, to the splits 15. The current from this battery has two paths depending on which contact 26 or 27, the tongue 30 rests. One path is through the wire 16, one of the contacts $a^{36}$, its corresponding wire 22, one side of the differential winding of the relay 21, through wires 24 and 28, thence through the tongue 30 and back to the battery. The other path is the same from the battery to the split 23, then through wires 25 and 29 to the tongue 30 and back to the battery 31. Whichever path is followed hold the tongues of the relays 31 on a certain side and a reversal of the tongue 30, causes a corresponding reversal of the tongue of 21.

The trailer, $a^{49}$, sweeping over the contacts, $a^{38}$, puts each of the six keys $a^{56}$ successively in connection with the line 17. Rotating at a speed of twelve revolutions per second, let us say, puts each key in communication with the line thirty-six times per second, which permits of the fastest rate of sending on the keys. All the keys being open as shown, impulses of only one polarity (from battery $a^{55}$) are sent into the line at the rate (assuming twelve R. P. S.) of 216 per second. By the depression of any one of the keys $a^{56}$, the current in the line is reversed while the trailer $a^{49}$ is crossing over its corresponding contacts on the transmitting sunflower. None of these impulses of course affect the relay 14, since the current divides at 15, and an equal amount passing through both differential windings of 14 half passing into the real line, 17, to be received at the other end, and half passing through the artificial line 18.

The trailer, $b^{49}$, (Figs. 10, 11 and 12) at the other end of the line rotates in synchronism with $a^{49}$, which will be explained later. The connection being the same, this trailer, $b^{49}$, also sends 216 impulses into the line 17 per second (assuming 12 R. P. S.) and each key, $b^{56}$, is in communication with the line thirty-six times per second. These impulses are received on the relay 14 (Fig. 8). All the keys $b^{56}$ being open, impulses of one polarity are sent into the line and thus the tongue 30 remains on one side, say contact 27, so that the current from battery 31 has its circuit completed through the side 29, the polarity being such that the armature of the relays 21 are held against their back stops 32. Now suppose a distant key, $b^{56}$, to be depressed. Then every time the trailer, $b^{49}$, passes over the contacts $b^{38}$, which correspond to that particular key, the current will be reversed in polarity, which will occur at the rate of thirty-six times per second. Hence the armature or tongue 30 of the relay 14, will cross the gap and make contact with 26 at that same rate, i. e. thirty-six times per second. Now since each relay 21 is in communication with the trailer $a^{49}$ thirty-six times per second, this reversal of tongue 30 will cause the current from battery 31 to flow through the trailer, through a certain contact, $a^{36}$, corresponding to the key that is depressed, thence through one leg of the differential winding of relay connected to the said contact, and returning to the battery by way of wire 28, and tongue 30. This, it will be noted, is the opposite leg of the differential winding from what it would be if the tongue had not reversed its position. Hence the tongue of the relay 21, which corresponds to the depressed key, will also reverse and move over to its front contact 33 through which a circuit may be closed to operate any form of receiver such as a sounder or a Morse recorder. Depressing any other key, $b^{56}$, will operate a corresponding relay (and only one) of the group 21, so that each key (also the group $a^{56}$) has a certain corresponding relay and receiver completely at its disposal.

Means for synchronizing the trailers are shown in Figs. 10, 11, 12, and 13. As stated above, the trailer, $a^{49}$, sweeping over the contacts, send into the line at twelve R. P. S., 216 impulses per second. The other motor is set to run at approximately the same speed normally. Now, these impulses, coming from $a^{49}$, pass through the magnet $b^{21}$, (Fig. 10) and holds the armature $b^{12}$, (and trailer 49 of course) in synchronism with the trailer, $a^{49}$, by retarding or accelerating $b^{12}$ according as it is running too fast or too slow. When in synchronism the armature, $b^{12}$, presents to the magnet, $b^{21}$, as many teeth per unit of time as there are impulses received per unit of time. Hence the trailers, $a^{49}$ and $b^{49}$, are always in the same angular rotation to one another, and every contact or key has a definite corresponding contact and receiver. In other words, each key has control over its corresponding relay and only that one. Reversals of polarity do not interfere with the synchronism since the magnet $b^{21}$ attracts with any polarity.

Figure 10:
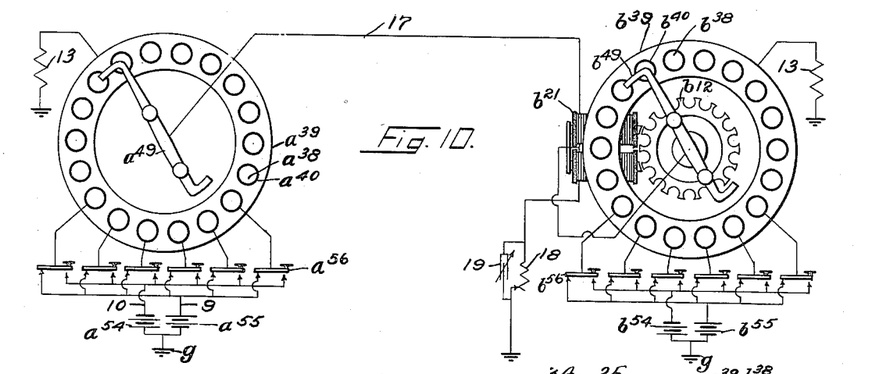
Figs. 10, 11 and 12 are wiring diagrams of both ends of the line, showing three different methods of synchronizing.
Figure 11:
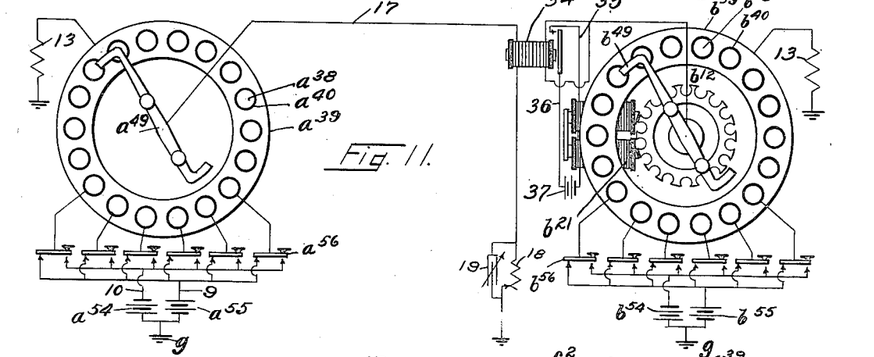

Fig. 11 is a modification of Fig. 10. It merely introduces a non-polarized relay 34 into the line, the armature of which closes the circuit 35, 36 and $b^{21}$, for the battery 37, for every impulse sent over the line 17. It operates with any polarity and merely relays the feeble line currents into the magnet, $b^{21}$.

Figure 12:
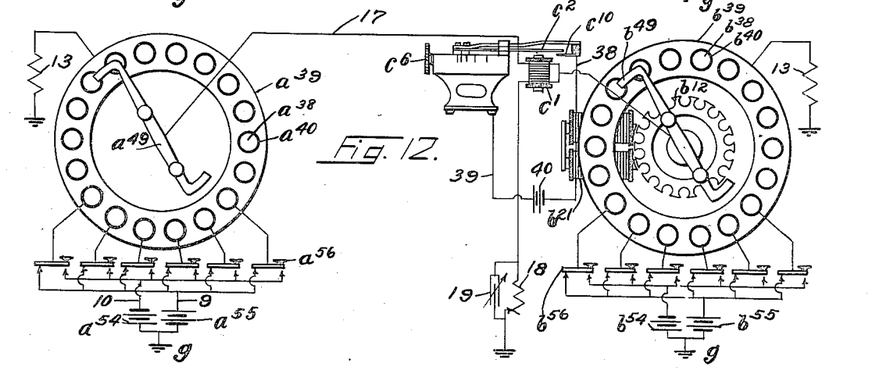

Fig. 12 employs the speed indicator and governor for synchronism. The reed $c^2$ is adjusted by the thumb-nut $c^6$, until it vibrates in resonance with the received impulses, and closes the circuit through the contact $c^{10}$, 38, 39 and battery 40. Thus its function is the same as that of the relay 34 of Fig. 11. The magnet $c^1$ being non-polarized attracts with any polarity.

Figure 13:
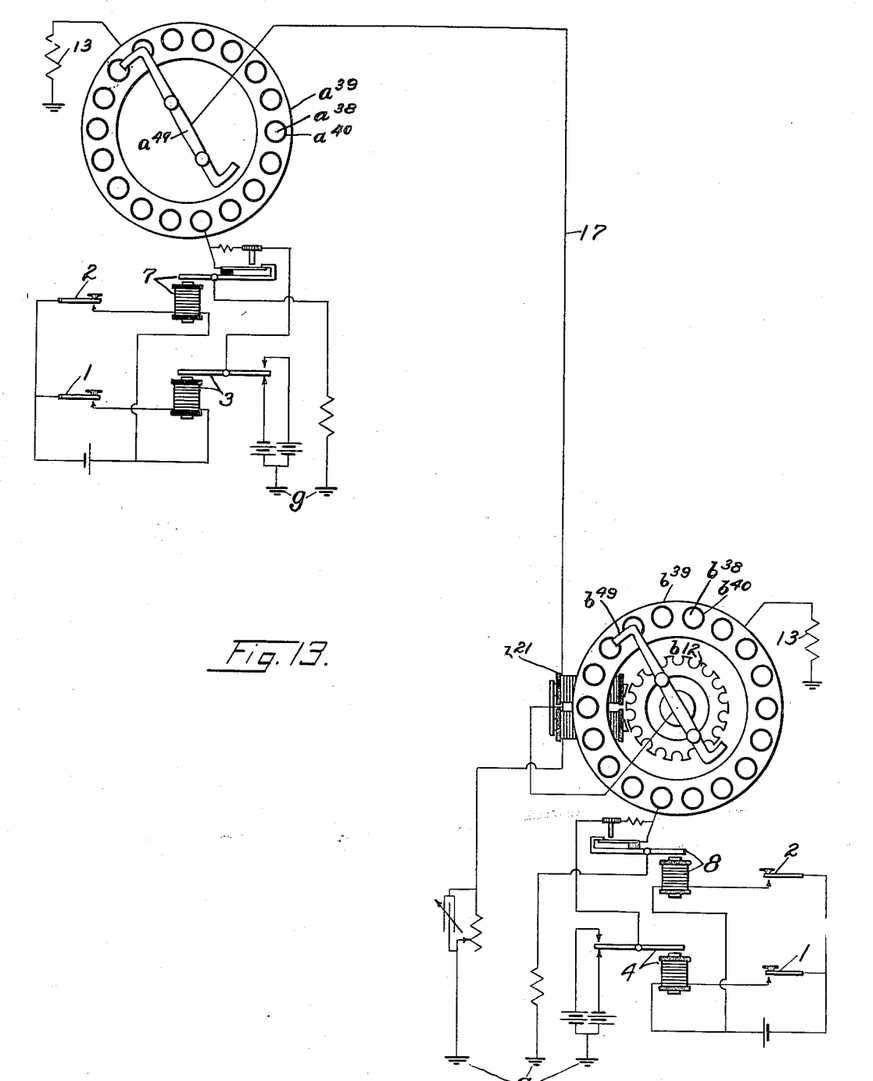
Fig. 13 is a diagrammatic view showing how each transmission channel may be worked on the ordinary quadruple method.

Fig. 13 shows how each transmission channel may be operated on the ordinary quadruplex scheme. Keys 1 and 2 operate the pole changer, 3 and 4 and keys 5 and 6 operate the current changers 7 and 8. The magnet, $b^{21}$, is connected in the same way as in Fig. 10, but may be used as in Figs. 11 and 12. It will be understood that the synchronism remains unchanged by any variation of current caused by depressing the key 2. The synchornism depends only upon the number of impulses per second and is absolutely independent of polarity or strength, (within working limits) of the current.

In order to compensate for the lag of transmission, signals caused by capacity, etc., of the line, the receiving sunflower, $a^{37}$, may be shifted by means of the thumb-nut, $a^{42}$, (or $b^{42}$) until the best position for receiving is found (Figs. 1, 2 and 3).

I claim as my invention:

1. The method of maintaining the synchronous operation of a pair of sunflowers which consists in applying a primary driving power to each sunflower independently of the other, transmitting from one sunflower to the other a continuous train of impulses of a frequency determined by the rate of rotation of the transmitting sunflower, and utilizing each of said continuous train of impulses to apply to the receiving sunflower a secondary driving power which acts in conjunction with or in opposition to said primary driving power of the receiving sunflower according as the difference between the frequency of said train of impulses and that of said sunflower is positive or negative.

2. The method of maintaining the synchronization of a pair of sunflowers which consists in applying to the receiving sunflower a primary driving power independently of the transmitting sunflower, transmitting from one sunflower to the other a continuous train of impulses the frequency of which is determined by the rate of rotation of the transmitting sunflower, and through each impulse transmitted applying to the receiving sunflower a secondary driving power proportional and of a sign corresponding to the difference between the frequency of the receiving sunflower and the transmitted impulses.

3. The method of synchronizing a pair of sunflowers which consists in independently applying to each sunflower a primary driving power, continuously governing the application of said primary driving power in response to variations from the desired frequency, transmitting from one sunflower to the other a continuous train of impulses the frequency of which is proportional to the rate of rotation of the transmitting sunflower, and through each transmitted impulse applying to the receiving sunflower a secondary driving power proportional and of a sign corresponding to the difference between the frequency of the receiving sunflower and the frequency of the transmitted impulses.

4. The method of maintaining synchronization of a pair of sunflowers which method consists in applying a primary driving power to each motor independently of the other, governing the application of the driving primary power of one motor in response to variation from a predetermined standard of frequency independently of the rate of rotation of the other sunflower, transmitting from the other sunflower to the said governed one a continuous train of impulses, and through each impulse applying to said receiving sunflower a secondary driving power proportional and of a sign corresponding to the difference between the frequency of said train of impulses and the frequency of rotation of said receiving sunflower.

5. The method of maintaining the synchronization of a pair of sunflowers which method consists in applying primary driving power to one independently of the other, governing the application of said primary driving power in response to variation from a predetermined standard independently of the other sunflower, transmitting from the other sunflower to the governed one a continuous train of impulses of a frequency determined by the transmitting sunflower, and at each impulse applying to said governed sunflower a secondary driving power proportional and of a sign corresponding to the difference between the frequency of said train of impulses and the frequency of rotation of the governed sunflower and independently of the aforesaid government of the primary driving power thereof.

6. A system of synchronous telegraphy, comprising a pair of sunflowers, each of which is adapted to transmit to the other a continuous train of impulses proportional to the rate of rotation thereof, a primary driving motor for each sunflower, local power connections for each motor, a local speed governor for each motor arranged to regulate the speed according to a predetermined standard, and a secondary driving motor for each sunflower deriving its power from the received train of impulses and whose tendency to drive is in one direction or the other according as the frequency of the associated sunflower is greater or less than the frequency of the received impulses.

7. A system of synchronous telegraphy, comprising a transmitting and a receiving sunflower, a primary driving motor for the receiving sunflower, power connections therefor independent of the transmitting sunflower, a speed governor therefor also independent of said transmitting sunflower, a transmitting line between the sunflowers, and a secondary driving motor for said receiving sunflower connected with said transmission line and with said sunflower to tend to drive the same in one direction or the other according as the difference in frequency between the transmitted train of signal impulses and the frequency of rotation of said receiving sunflower is negative or positive.

8. A system of synchronous telegraphy, comprising transmitting and receiving sunflowers, a primary driving motor for said receiving sunflower independent of the transmitting sunflower, power connections therefor also independent of said transmitting sunflower, a transmission line interconnecting said sunflowers and over which one sunflower may transmit to the other a continuous train of signal impulses, and a secondary driving motor for said receiving sunflower independent of the primary driving motor and connected with the said transmission line and said receiving sunflower to tend to drive the same in one direction or another according to whether the difference between the frequency of the train of impulses and the frequency of rotation of the receiving sunflower is of one sign or the other.

9. In a system of synchronous telegraphy, a sunflower, a primary driving motor for said sunflower, local power connections therefor, an independently operating secondary driving motor adapted to be controlled by signal impulses and connected to said sunflower to tend to drive the same in one direction or another according as the difference between the frequency of the controlling signal impulses and the frequency of rotation of said sunflower is of one sign or the other, and means to transmit said signal impulses.

10 In a system of synchronous telegraphy, a sunflower, a toothed armature connected to rotate the same, a primary motor magnet juxtaposed to said armature, a local power circuit for said primary motor magnet, speed governing means in said circuit, a secondary motor magnet also juxtaposed to said armature and arranged in such angular position with respect to the primary motor magnet as to exert a radial draft on the teeth of said armature when energized in synchronism with the primary driving motor, whereby when energized in asynchronism it exerts a tangential driving force in conjunction with or in opposition to the driving force of the primary motor magnet according as the frequency of its energization is greater or less than the frequency of energization of the primary driving magnet.

11. In a system of synchronous telegraphy, a sunflower, an intermittently energized driving motor for the same, the energization of which is controlled from a commutator connected with the sunflower, the connections from the commutator including an angularly adjustable brush by means of the adjustment of which the speed of rotation of the sunflower may be adjusted.

12. In a system of synchronous telegraphy, a sunflower, a toothed armature connected to rotate the same, a primary motor magnet juxtaposed to said armature, a local power circuit for said primary magnet, and a secondary motor magnet also juxtaposed to said armature and arranged in such angular position with respect to the primary motor magnet as to exert a radial draft on the teeth of said armature when energized in synchronism with the primary driving motor, whereby when energized in asynchronism it exerts a tangential driving force in conjunction with or in opposition to the driving force of the primary motor magnet according as the frequency of its energization is greater or less than the frequency of energization of the primary driving magnet.

In witness whereof, I have hereunto set my hand this 28th day of October 1912.

EINER W. LARSEN.

Witnesses:
 EDWARD A. PAUL,
 GENEVIEVE E. SORENSEN.